(12) United States Patent
Wang

(10) Patent No.: US 9,081,977 B2
(45) Date of Patent: Jul. 14, 2015

(54) METHOD AND APPARATUS FOR PRIVILEGE CONTROL

(71) Applicant: Donglin Wang, Beijing (CN)

(72) Inventor: Donglin Wang, Beijing (CN)

( * ) Notice: Subject to any disclaimer, the term of this patent is extended or adjusted under 35 U.S.C. 154(b) by 400 days.

(21) Appl. No.: 13/691,865

(22) Filed: Dec. 3, 2012

(65) Prior Publication Data

US 2013/0124568 A1 May 16, 2013

Related U.S. Application Data

(63) Continuation-in-part of application No. 12/884,903, filed on Sep. 17, 2010, now abandoned, which is a continuation of application No. PCT/CN2009/070439, filed on Feb. 16, 2009, application No. 13/691,865, which is a continuation-in-part of application No. 12/133,309, filed on Jun. 4, 2008, which is a continuation-in-part of application No. PCT/CN2006/003294, filed on Dec. 5, 2006.

(30) Foreign Application Priority Data

| Dec. 5, 2005 | (CN) | 2005 1 0126683 |
| Dec. 9, 2005 | (CN) | 2005 1 0131071 |
| Mar. 18, 2008 | (CN) | 2008 1 0102153 |

(51) Int. Cl.
| G06F 17/30 | (2006.01) |
| G06F 17/00 | (2006.01) |
| G06F 21/62 | (2013.01) |
| G06F 17/22 | (2006.01) |

(52) U.S. Cl.
CPC ............ *G06F 21/62* (2013.01); *G06F 21/6227* (2013.01); *G06F 17/2247* (2013.01); *G06F 17/30011* (2013.01); *Y10S 707/954* (2013.01); *Y10S 707/99945* (2013.01)

(58) Field of Classification Search
CPC ........... G06F 17/30011; G06F 17/2247; Y10S 707/954; Y10S 707/99945
USPC ................... 707/608, 783, 786, 797; 715/200
See application file for complete search history.

(56) References Cited

U.S. PATENT DOCUMENTS

| 6,324,551 | B1 * | 11/2001 | Lamping et al. | 715/229 |
| 7,254,588 | B2 * | 8/2007 | Sung et al. | 1/1 |
| 8,171,389 | B2 * | 5/2012 | Wang et al. | 715/204 |
| 8,645,344 | B2 * | 2/2014 | Wang et al. | 707/705 |
| 2005/0240572 | A1 * | 10/2005 | Sung et al. | 707/3 |
| 2011/0016151 | A1 * | 1/2011 | Wang | 707/783 |

FOREIGN PATENT DOCUMENTS

EP 0986010 A2 * 3/2000

* cited by examiner

*Primary Examiner* — Cheryl Lewis
(74) *Attorney, Agent, or Firm* — Flener IP Law; Zareefa Flener

(57) ABSTRACT

The present invention discloses a method and apparatus for privilege control to provide comprehensive privilege control with fine granularity. Document data stored in the docbase management system includes at least one document data object, and the at least one document object supports at least one privilege. When setting a privilege for a role over a document data object, a privilege is selected from the at least one privilege supported by the document data object, and the selected privilege is set as the privilege of the role over the document data object. When the role is to perform an operation on the document data object, the operation of the role on the document data object is controlled according to the privilege of the role over the document data object.

20 Claims, 2 Drawing Sheets

METHOD AND APPARATUS FOR PRIVILEGE CONTROL

CROSS-REFERENCE TO RELATED APPLICATION

The application is a continuation in part of U.S. patent application Ser. No. 12/884,903, filed Sep. 17, 2009, which claims priority of PCT/CN2008/072010 (filed on Aug. 15, 2008), which claims priority of Chinese patent application 200710120325.3 (filed on Aug. 15, 2007); and the application is also a continuation in part of U.S. patent application Ser. No. 12/133,309 (filed on Jun. 4, 2008), which is a continuation-in-part of International Application No. PCT/CN2006/003294 (filed on Dec. 5, 2006), which claims priority to Chinese Application No. 200510126683.6 (filed Dec. 5, 2005), and 200510131071.6 (filed on Dec. 9, 2005), the entire contents of which are incorporated herein by reference.

FIELD OF THE INVENTION

The present invention relates to docbase management system, and more particularly, to a method and apparatus for privilege control.

BACKGROUND OF THE INVENTION

When performing document management and control utilizing privileges in current document privilege control techniques, the following steps are generally included:

1, setting a privilege for a document;

2, inquiring the privilege set for the document according to a request of a user, determining whether the request should be allowed, if the request should be allowed, performing corresponding operations; otherwise, rejecting the request.

In the above procedure, the following basic privileges can be implemented, including viewing the title, reading and deleting and so on. But this is far from meeting the increasing requirements of users.

In existing document privilege control techniques including techniques for controlling a docbase management system, application software may log in the docbase management system in a certain role. If the role has a reading privilege, the application software can save the document in a hard disk. Then a user logging in using the role not only can read the document but also can perform other operations such as editing and printing on the document. The user is a concept used in the application software, whereas the role is a concept used in the docbase management system. One user may correspond to multiple roles.

In view of the above, when a role obtains a reading privilege, at the same time it also obtains privileges including editing and printing. However, in practical document management, some document may be of great importance, it may be desirable to allow all roles to read the document but not to allow all the roles to perform operations such as making modifications to the document.

With the continuous development of information technologies, a document storage system may store a large number of documents. Various clients may search and view the documents stored in the document storage system via networks. Due to the varieties of clients and users, existing document privilege control technique can no longer adapt to ever emerging new types of documents and meet continuously changing requirements of users. Therefore, there is a need for a privilege control technique which is able to provide functions regarding arrangement, management, security, presence and storage for the large number of documents and provide diversified privilege control.

SUMMARY OF THE INVENTION

Embodiments of the present invention provide a method and an apparatus for privilege control, so as to provide comprehensive privilege control with fine granularity.

According to an embodiment of the present invention, a method for privilege control comprises:

selecting a privilege from at least one privilege supported by a document data object of document data stored in a docbase management system, wherein, the document data stored in the docbase management system includes at least one document data object, and the at least one document data object supports the at least one privilege;

setting, when setting a privilege for a role on the document data object, the privilege selected as the privilege of the role over the document data object; and controlling, when the role is to perform an operation on the document data object, the operation of the role on the document data object according to the privilege of the role over the document data object.

According to another embodiment of the present invention, an apparatus for privilege control comprises: a processor and a memory storing instructions executable by the processor, and further comprises:

a first module, adapted to set at least one privilege for at least one document data object of document data stored in a docbase management system which is supported by the at least one document data object, wherein, the document data stored in the docbase management system includes the at least one document data object, and the at least one document object supports the at least one privilege;

a second module, adapted to select, when setting a privilege for a role over a document data object, a privilege from the at least one privilege set by the first module for the document data object and supported by the document data object, and set the privilege selected as the privilege of the role over the document data object; and a third module, adapted to control, when the role is to perform an operation on the document data object, the operation of the role on the document data object according to the privilege set by the second module for the role over the document data object.

In embodiments of the present invention, the document data stored in the docbase management system consists of at least one document data object and each document data object supports a privilege. Then a privilege is allocated to each role for each document data object. Thus, according to the privileges allocated to the role for different document data objects, the docbase management system is able to control operations of the role on the document data objects. It can be seen that through the method and apparatus provided by the embodiments of the present invention, privileges to document data can be fully controlled with fine granularity. Therefore privilege management of document data can be enhanced.

DETAILED DESCRIPTION OF THE INVENTION

Figure 1:
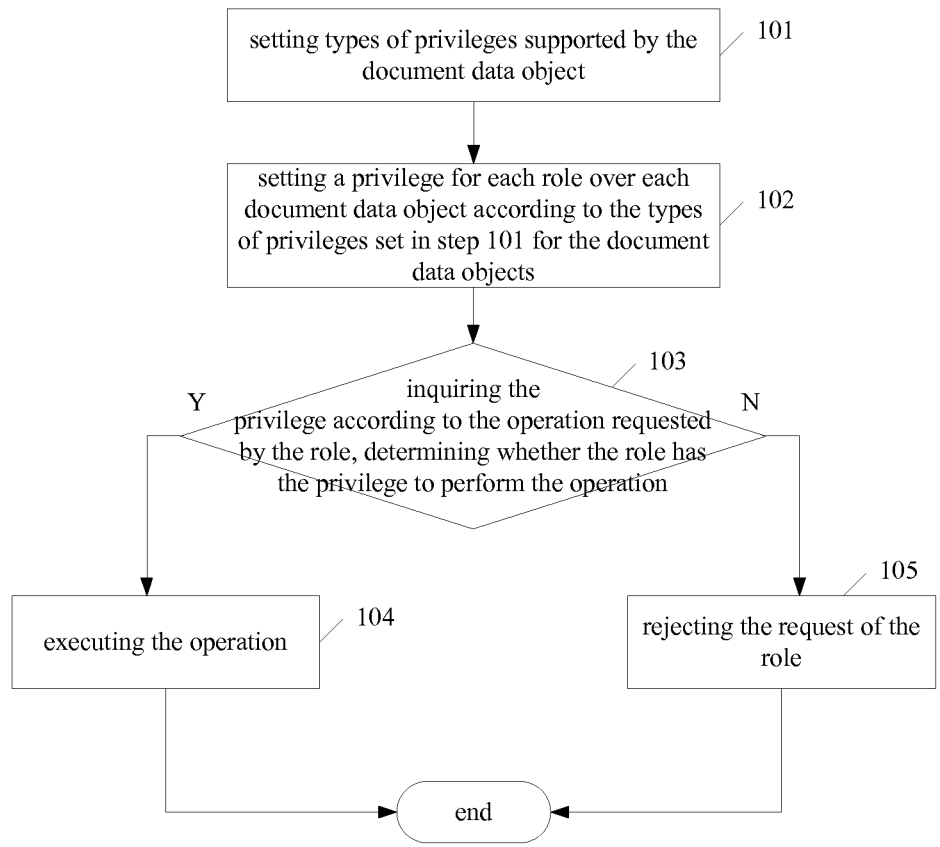
FIG. 1 is a flowchart illustrating a general method for privilege control in a docbase management system according to an embodiment of the present invention.

The present invention will be described in detail hereinafter with reference to accompanying drawings and embodiments to make the technical solution and merits therein clearer.

In embodiments of the present invention, document data stored in the docbase management system has a tree-shape structure which contains at least one node object. The document data may be disassembled into multiple document data objects. Types and the range of privileges controlled can be increased by setting for each document data object a privilege supported by the document data object. In the docbase management system, fine-granularity control over various operations on the document data can be implemented by setting for each role a privilege for each document data object and controlling operations performed by the role on document data objects according to privileges allocated to the role for different document data objects.

The docbase management system is a universal technical platform with all kinds of document processing functions and an application issues an instruction to the docbase management system via an interface layer to process a document, then the docbase management system performs corresponding operation according to the instruction. In this way, as long as different applications and docbase management systems follow the same standard, different applications can process a same document through a same docbase management system, therefore document interoperability is achieved. Similarly, one application may process different documents through different docbase management systems without independent development on every document format.

Furthermore, the technical scheme of the present invention provides a universal document model which makes different applications compatible with different documents to be processed. The interface standard is based on the document model so that different applications can process a same document via the interface layer. The universal document model can be applied to all types of document formats so that one application may process documents in different formats via the interface layer. The interface standard defines various instructions based on the universal document model for operations on corresponding documents and the way of issuing instructions by an application to a docbase management system(s). The docbase management system has functions to implement the instructions from the application. The universal model includes multiple hierarchies such as a docset including a number of documents, a docbase and a document warehouse. And the interface standard includes instructions covering organization management, query and security control, of multiple documents. In the universal model, a page is separated into multiple layers from bottom to top and the interface standard includes instructions for operations on the layers, storage and extraction of a source file corresponding to a layer in a document. In addition, the docbase management system has information security management control functions for documents, e.g., role-based fine-grained privilege management, and corresponding operation instructions are defined in the interface standard.

According to the present invention, the application layer and the data processing layer are separated with each other. An application no longer needs to deal with document formats directly and a document format is no longer associated with a specific application. Therefore a document can be processed by different applications and an application can process documents in different formats and document interoperability is achieved. The whole document processing system can further process multiple documents instead of one document. When a page in a document is divided into multiple layers, different management and control policies can be applied to different layers to facilitate operations of different applications on the same page (it can be designed that different applications manage and maintain different layers) and further facilitate source file editing and it is also a good way to preserve the history of editing.

The document processing system in which the method and system for security management of the present invention are applied is explained in detail as followings The document processing system in accordance with the present invention includes an application, an interface layer, a docbase management system and a storage device.

The application includes any of existing document processing and contents management applications in the application layer of the document processing system, and the application sends an instruction in compliance with the interface standard to process documents. All operations are applied on documents in compliance with the universal document model regardless of the storage formats of the documents.

The interface layer is in compliance with the interface standard for interaction between the application layer and the docbase management system. The application layer sends standard an instruction to the docbase management system via the interface layer and the docbase management system returns the result of corresponding operation to the application layer via the interface layer. It can be seen that, since all applications can sends a standard instruction via the interface layer to process a document in compliance with the universal document model, different applications can process a same document through a same docbase management system and a same application can process documents in different formats through different docbase management systems.

Preferably, the interface layer includes an upper interface unit and a lower interface unit. The application layer can send a standard instruction from the upper interface unit to the lower interface unit and the docbase management system receives the standard instruction from the lower interface unit. The lower interface unit is further used for returning the result of the operation performed by the docbase management system to the application system through the upper interface unit. In practical applications, the upper interface unit can be set up in the application layer and the lower interface unit can be set up in the docbase management system.

The docbase management system is the core layer of the document processing system and performs an operation on a document according to a standard instruction from the application through the interface layer.

The storage device is the storage layer of the document processing system. A common storage device includes a hard disk or memory, and also can include an optical disk, flash memory, floppy disk, tape, remote storage device, or any kind of device that is capable of storing data. The storage device stores multiple documents and the way of storing the documents is irrelevant to applications.

It can thus be seen that the present invention enables the application layer to be separated from the data processing layer in deed. Documents are no longer associated with any specified applications and an application no longer needs to deal with document formats. Therefore different applications can edit a same document in compliance with the universal document model and satisfactory document interoperability is achieved among the applications.

The system for processing the document may comprise an application and a platform software (such as docbase management system). The application performs an operation on abstract unstructured information by issuing one or more instructions to the platform software. The platform software receives the instructions, maps the operation on abstract unstructured information to the operation on storage data corresponding to the abstract unstructured information, and performs the operation on the storage data. It is noted that the abstract unstructured information are independent of the way in which the storage data are stored.

Storage data refer to various kinds of information maintained or stored on a storage device (e.g., a non-volatile persistent memory such as a hard disk drive, or a volatile memory) for long-term usage and such data can be processed by a computing device. The storage data may include complete or integrated information such as an office document, an image, or an audio/video program, etc. The storage data are typically contained in one disk file, but such data may also be contained in multiple (related) files or in multiple fields of a database, or an area of an independent disk partition that is managed directly by the platform software instead of the file system of the OS. Alternatively, storage data may also be distributed to different devices at different places. Consequently, formats of the storage data may include various ways in which the information can be stored as physical data as described above, not just formats of the one or more disk files.

Storage data of a document can be referred to as document data and it may also contain other information such as security control information or editing information in addition to the information of visual appearance (appearance information) of the document. A document file is the document data stored as a disk file.

Here, the word "document" refers to information that can be printed on paper (e.g., static two-dimension information). It may also refer to any information that can be presented, including multi-dimension information or stream information such as audio and video.

In some embodiments, an application performs an operation on an (abstract) document, and it needs not to consider the way in which the data of the document are stored. A platform software (such as a docbase management system) maintains the corresponding relationship between the abstract document and the storage data (such as a document file with specific format), e.g., the platform software maps an operation performed by the application on the abstract document to an operation actually on the storage data, performs the operation on the storage data, and returns the result of such operation back to the application when the return of the result is requested.

In some embodiments, the abstract document can be extracted from the storage data, and different storage data may correspond to the same abstract document. For example, when the abstract document is extracted from visual appearance (also called layout information) of the document, different storage data having the same visual appearance, no matter the ways in which they are stored, may correspond to the same abstract document. For another example, when a Word file is converted to a PDF file that has same visual appearance, the Word file and the PDF file are different storage data but they correspond to the same abstract document. Even when the same document is stored in different versions of Word formats, these versions of Word files are different storage data but they correspond to the same abstract document.

In some embodiments, in order to record the visual appearance properly, it would be better to record position information of visual contents, such as text, image and graphic, together with resources referenced, such as linked pictures and nonstandard fonts, to ensure fixed position of the visual contents and to guarantee that the visual contents is always available. A layout-based document meets the above requirements and is often used as storage data of the platform software.

The storage data created by platform software is called universal data since it is accessible by standard instructions and can be used by other applications that conform to the interface standard. Besides universal data, an application is also able to define its own unique data format such as office document format. After opening and parsing a document with its own format, the application may request creating a corresponding abstract document by issuing one or more standard instructions, and the platform software creates the corresponding storage data according to the instructions. Although the format of the newly created storage data may be different from the original data, the newly created storage data, the universal data, corresponds to the same abstract document with the original data, e.g., it resembles the visual appearance of the original data. Consequently, as long as any document data (regardless of its format) corresponds to an abstract document, and the platform software is able to create a storage data corresponding to the abstract document, any document data can be converted to an universal data that corresponds to same abstract document and is suitable to be used by other applications, thus achieving document interoperability between different applications conforms to the same interface standard.

For a non-limiting example, an interoperability process involving two applications and one platform software is described below. The first application creates first abstract document by issuing a first set of instructions to the platform software, and the platform software receives the first set of instructions from the first application and creates a storage data corresponding to the first abstract document. The second application issues a second set of instructions to the platform software to open the created storage data, and the platform software opens and parses the storage data according to the second set of instructions, generating second abstract document corresponding to the said storage data. Here, the second abstract document is identical to or closely resembles the first abstract document and the first and second sets of instructions conform to the same interface standard, making it possible for the second application to open the document created by first application.

For another non-limiting example, another interoperability process involving one application and two platform software is described below. The first platform software parses first storage data in first data format, generates a first abstract document corresponding to the storage data. The application retrieves all information from the first abstract document by issuing a first set of instructions to the first platform software. The application creates a second abstract document which is identical to or closely resembles the first abstract document by issuing a second set of instructions to the second platform software. The second platform creates second storage data in second data format according the second set of instructions. Here, the first and second sets of instructions conform to the same interface standard, enabling the application to convert data between different formats and retain the abstract feature unchanged. The interoperability process involving multiple applications and multiple platform software can be deduced from the two examples above.

Due to limiting factors such as document formats and functions of relative software, the storage data may not be mapped to the abstract document with 100% accuracy and there may be some deviations. For a non-limiting example, such deviations may exist regardless of the precision floating point numbers or integers used to store coordinates of the visual contents. In addition, there may be deviations between the displaying/printing color and the predefined color if the software used for displaying/printing lacks necessary color management functions. If these deviations are not significant (for non-limiting examples, a character's position deviated 0.01 mm from where it should be, or an image with lossy compression by JPEG), these deviations can be ignored by users. The degree of deviation accepted by the users is related to practical requirements and other factors, for example, a professional art designer would be stricter with the color deviation than most people. Therefore, the abstract document may not be absolutely consistent with the corresponding storage data and displaying/printing results of different storage data corresponding to the same abstracted visual appearance may not be absolutely same with each other. Even if same applications are used to deal with the same storage data, the presentations may not be absolutely the same. For example, the displaying results under different screen resolutions may be slightly different. In the present invention, "similar" or "consistent with" or "closely resemble" is used to indicate that the deviation is acceptable, (e.g., identical beyond a predefined threshold or different within a predefined threshold). Therefore, storage data may correspond to, or be consistent with, a plurality of similar abstract documents.

The corresponding relationship between the abstract document and the storage data can be established by the platform software in many different ways. For example, the corresponding relationship can be established when opening a document file, the platform software parses the storage data in the document file and forms an abstract document to be operated by the application. Alternatively, the corresponding relationship can be established when platform software receives an instruction indicating creating an abstract document from an application, the platform software creates the corresponding storage data. In some embodiments, the application is aware of the storage data corresponding to the abstract document being processed (e.g., the application may inform the platform software where the storage data are, or the application may read the storage data into memory and submit the memory data block to the platform software). In some other embodiments, the application may "ignore" the storage data corresponding to the operated abstract document. For a non-limiting example, the application may require the platform software to search on Internet under certain condition and open the first searched documents.

Generally speaking, the abstract document itself is not stored on any storage device. Information used for recording and describing the abstract document can be included in the corresponding storage data or the instruction(s), but not the abstract document itself. Consequently, the abstract document can be called alternatively as a virtual document.

In some embodiments, the abstract document may have a structure described by a document model, such as a universal document model described hereinafter. Here, the statement "document data conform to the universal document model" means that the abstract document extracted from the document data conforms to the universal document model. Since the universal document model is extracted based on features of paper, any document which can be printed on a paper conforms to the document model, making such document model "universal".

In some embodiments, other information such as security control, document organization (such as the information about which docset a document belongs to), invisible information like metadata, interactive information like navigation and thread, can also be extracted from the document data in addition to visual appearance of the document. Even multi-dimension information or stream information such as audio and video can be extracted. All those extracted information can be referred to jointly as abstract information. Since there is no persistent storage for the abstract information, the abstract information also can be referred to as virtual information. Although most of embodiments of the present invention are based on the visual appearance of the document, the method described above can also be adapted to other abstract information, such as security control, document organization, multi-dimension or stream information.

There are various ways to issue the instruction used for operating on the abstract information, such as issuing a command string or invoking a function. An operation on the abstract information can be denoted by instructions in different forms. The reason why invoking a function is regarded as issuing the instruction is that addresses of difference functions can be regarded as different instructions respectively, and parameter(s) of the function can be regarded as parameter(s) of the instruction. When the instruction is described under "an operation action+an object to be operated" standard, the object in the instruction may either be the same or different from an object of the universal document model. For example, when setting the position of a text object of a document, the object in the instruction may be the text object, which is the same as the object of the universal document model, or it may be a position object of the text which is different with the object of the universal document model. In actual practice, it will be convenient to unify the objects of the instructions and the objects of universal document model.

The method described above is advantageous for document processing as it separates the application from the platform software. In practice, the abstract information and the storage data may not be distinguished strictly, and the application may even operate on the document data directly by issuing instruction to the platform software. Under such a scenario, the instruction should be independent of formats of the document data in order to maintain universality. More specifically, the instruction may conform to an interface standard independent of the formats of the document data, and the instruction may be sent through an interface layer which conforms to the interface standard. However, the interface layer may not be an independent layer and may comprise an upper interface unit and a lower interface unit, where the upper interface unit is a part of application and the lower interface unit is a part of platform software.

The embodiments of the document processing system provided by the present invention are described hereinafter.

Universal Document Model

The universal document model can be defined with reference to the features of paper since paper has been the standard means of recording document information, and the functions of paper are just enough to satisfy the needs of practical applications in work and living.

If a page in a document is regarded as a piece of paper, all information put down on the paper should be recorded, so the universal document model which is able to describe all visible contents on the page is demanded. The page description language (e.g., PostScript) in the prior art is used for describing all information to be printed on the paper and will not be explained herein. However, the visible contents on the page can always be categorized into three classes: characters, graphics and images.

When the document uses a specific typeface or character, corresponding font shall be embedded into the documents to guarantee identical output on screens/printer of different computers. The font resources shall be shared to improve storage efficiency, i.e., only one font needs to be embedded when a same character is used for different places. An image sometimes may be used in different places, e.g., the image may be used as the background images of all pages or as a frequently appearing company logo and it will be better to share the image, too.

Obviously, as a more advanced information process tool, the universal document model not only imitates paper, but also develops some enhanced digital features, such as metadata, navigation, thread, minipage, etc. Metadata includes data used for describing data, e.g., the metadata of a book includes information of author, publishing house, publishing date and ISBN. Metadata is a common term in the industry and will not be explained further herein. Navigation includes information similar to the table of contents of a book, and navigation is also a common term in the industry. The thread information describes the location of a passage and the order of reading, so that when a reader finishes a screen, the reader can learn what information should be displayed on the next screen. The thread also enables automatic column shift and automatic page shift without manually appointing a position by the reader. Minipage includes miniatures of all pages and the miniatures are generated in advance, the reader may choose a page to read by checking the miniatures.

The universal document model includes multiple layers including a document warehouse, docbase, docset, document, page, layer, object group and layout object.

The document warehouse consists of one or multiple docbases, and the relation among docbases is not as strictly regulated as the relation among hierarchies within a docbase. Docbases can be combined and separated simply without modifying the data of the docbases, and usually no unified index is set up for the docbases (especially a fulltext index), so most of operations on document warehouse search traverse the indexes of all the docbases without an available unified index. Every docbase consists of one or multiple docsets and every docset consists of one or multiple documents and possibly a random number of sub docsets. A document includes a normal document file (e.g., a .doc document) in the prior art and the universal document model may define that a document may belong to one docset only or belong to multiple docsets. A docbase is not a simple combination of multiple documents but a tight organization of the documents, especially the great convenience can be brought after unified query indexes are established for the document contents.

Every document consists of one or multiple pages in an order (e.g., from the front to the back), and the cores of the pages may be different. A page core may be even not in a rectangle shape but in a random shape expressed by one or multiple closed curves.

Further a page consists of one or multiple layers in an order (e.g., from the top to the bottom), and one layer is overlaid with another layer like one piece of glass over another piece of glass. A layer consists of a random number of layout objects and object groups. The layout objects include statuses (typeface, character size, color, ROP, etc.), characters (including symbols), graphics (line, curve, closed area filled with specified color, gradient color, etc.), images (TIF, JPEG, BMP, JBIG, etc.), semantic information (title start, title end, new line, etc.), source file, script, plug-in, embedded object, bookmark, streaming media, binary data stream, etc. One or multiple layout objects can form an object group, and an object group can include a random number of sub object groups.

The docbase, docset, document, page and layer may further include metadata (e.g., name, time of latest modification, etc., the type of the metadata can be set according to practical needs) and/or history. The document may further include navigation information, thread information and minipage. And the minipage may be placed in the page or the layer. The docbase, docset, document, page, layer and object group may also include digital signatures. The semantic information had better follow layout information to avoid data redundancy and facilitates the establishment of the relation between the semantic information and the layout. The docbase and document may include shared resources such as a font and image.

Further the universal document model may define one or multiple roles and grant certain privileges to the roles. The privileges are granted based on units including a docbase, docset, document, page, layer, object group and metadata. Privileges define whether a role is authorized to read, write, copy or print any one or any combination of the above units.

The universal document model is beyond the conventional way of one document for one file. A docbase includes multiple docsets and a docset includes multiple documents. Fine-grained access and security control is applied to document contents in the docbase so that even an individual character or rectangle can be accessed in the docbase while the prior document management system can only access as far as file name.

The organization structures of the objects are tree structures and are developed layer by layer into smaller objects.

The document warehouse object consists of one or multiple docbase objects (not shown in the drawings).

The docbase object includes one or multiple docset objects, a random number of docbase helper objects and a random number of docbase shared objects.

The docbase helper object includes: a metadata object, role object, privilege object, plug-in object, index information object, script object, digital signature object and history object etc. The docbase shared object includes an object that may be shared among different documents in the docbase, such as a font object and an image object.

Every docset object includes one or multiple document objects, a random number of docset objects and a random number of docset helper objects. The docset helper object includes a metadata object, digital signature object and history object. When the docset object includes multiple docset objects, the structure of the object is similar to the structure of a folder including multiple folders in the Windows system.

Every document object includes one or multiple page objects, a random number of document helper objects and a random number of document shared objects. The document helper object includes a metadata object, font object, navigation object, thread object, minipage object, digital signature object and history object. The document shared object includes an object that may be shared by different pages in the document, such as an image object and a seal object.

Every page object includes one or multiple layer objects and a random number of page helper objects. The page helper object includes a metadata object, digital signature object and history object.

Every layer object includes one or multiple layout objects, a random number of object groups and a random number of layer shared objects. The layer helper object includes a metadata object, digital signature object and history object. The object group includes a random number of layout objects, a random number of object groups and optional digital signature objects. When the object group includes multiple object groups, the structure of the object is similar to the structure of a folder including multiple folders in the Windows system.

The layout object includes a status object, character object, line object, curve object, arc object, path object, gradient color object, image object, streaming media object, metadata object, note object, semantic information object, source file object, script object, plug-in object, binary data stream object, bookmark object and hyperlink object.

Further the status object includes a random number of character set objects, typeface objects, character size objects, text color objects, raster operation objects, background color objects, line color objects, fill color objects, linetype objects, line width objects, line joint objects, brush objects, shadow objects, shadow color objects, rotate objects, outline typeface objects, stroke typeface objects, transparent objects and render objects.

The universal document model can be enhanced or simplified based on the above description practically. If a simplified document model does not include a docset object, the docbase object shall include a document object directly. And if a simplified document model does not include a layer object, the page object shall include a layout object directly.

A skilled in the art can understand that a minimum universal document model includes only a document object, page object and layout object. And the layout object includes only a character object, line object and image object. The models between a full model and the minimum model are included in the equivalents of the preferred embodiments of the present invention.

Furthermore, a universal document security model needs to be defined to satisfy the document security of various practical needs. The universal document security model shall cover and excel the universal document security models employed by applications in the prior art and the definition of the universal document security model covers items as follows.

1. Role Object

A role is defined in a docbase and a role object is created, and the role object is usually the sub-object of the docbase. When corresponding universal document model does not include a docbase object, the role shall be defined in a document, i.e., the role object shall be the sub-object of a document object and all docbases in the universal document security model shall be replaced with documents.

2. Grant an Access Privilege to a Specified Role

An access privilege for any role on any object (e.g. a docbase object, docset object, document object, page object, layer object, object group object and layout object) can be set up. If a privilege on an object is granted to a role, the privilege can be inherited by all sub-objects of the object.

Access privileges in the docbase management system may include any one or any combination of the following privileges on objects: read privilege, write privilege, re-license privilege (i.e., granting part of or all the privilege of itself to another role), and bereave privilege (i.e., deleting part of or all the privileges of another role). However, the privileges provided by the present invention are not limited to any one or any combinations of the privileges described above and more privileges can be defined, e.g., print prohibition.

3. Attach a Signature of Role to an Object

A signature of a role can be attached to an object. The signature covers the sub-objects of the object and objects referenced by the object.

4. Create a Role

A key of a role used for login process shall be returned in response to an instruction of creating a role object, the key is usually a private key of the PKI key pair and should be kept carefully by the application. The key also can be a login password. Preferably, all applications are allowed to create a new role to which no privilege is granted. Certain privileges can be granted to the new role by existing roles with re-license privilege.

5. Login of Role

When an application logs in as a role, the "challenge-response" mechanism can be employed, i.e., the docbase management system encrypts a random data block with the public key of the role and sends the encrypted data to the application, the application decrypts the data and returns the decrypted data to the docbase management system, if the data are correctly decrypted, it is determined that the application does have the private key of the role (the "challenge-response" authentication process may be repeated for several times for double-check). The "challenge-response" mechanism may also include processes as follows. The docbase management system sends a random data block to the application; the application encrypts the data with the private key and returns the encrypted data to the docbase management system, and the docbase management system decrypts the encrypted data with the public key, if the data is correctly decrypted, it is determined that the application does have the private key of the role. The "challenge-response" mechanism provides better security for the private key. When the key of the role is a login password, users of the application have to enter the correct login password.

In addition, the application may log in as multiple roles and the privileges granted to the application is the union of the privileges of the roles.

6. A Default Role

A special default role can be created. When a default role is created, the corresponding docbase can be processed with the default role even when no other role logs in. Preferably, a docbase creates a default role with all possible privileges when the docbase is created.

Practically the universal document security model can be modified into an enhanced, simplified or combined process, and the modified universal document security model is included in the equivalents of the embodiments of the present invention.

The docbase management system may store and organize the data of the docbase in any form, e.g., the docbase management system may save all files in a docbase in a file on a disk, or create one file on the disk for one document and organize the documents by using the file system functions of the operating system, or create one file on the disk for one page, or allocate room on disk and manage the disk tracks and sectors without referencing to the operating system. The docbase data can be saved in a binary format, in XML, or in binary XML. The page description language (used for defining objects including texts, graphics and images in a page) may adopt PostScript, or PDF, or SPD, or a customized language. To sum up, any definition method that enables the interface standard to achieve the functions described herein is acceptable.

For example, the docbase data can be described in XML and when the universal document model is hierarchical, an XML tree can be built accordingly. An operation of creating adds a node in the XML tree and an operation of deleting deletes a node in the XML tree, an operation of setting sets the attributes of corresponding node and an operation of getting gets the attributes of corresponding node and returns the attribute information to the application, and an operation of searching traverses all related nodes. A further description of an embodiment is given as follows.

1. XML is used for describing every object; therefore an XML tree is created for every object. Some objects show simple attributes and the XML trees corresponding to the objects will have only the root node; some objects show complicate attributes and the XML trees corresponding to the objects will have root node and children nodes. The description of the XML trees can be created with reference to the XML definitions of the operation objects given in the foregoing description.

2. When a new docbase is created, a new XML file which root node is the docbase object shall be created.

3. When a new object (e.g., a character object) is inserted into the docbase, the XML tree corresponding to the new object shall be inserted under corresponding parent node (e.g., a hierarchy). Therefore every object in the docbase corresponds to a node in the XML tree whose root node is the docbase.

4. When an object is deleted, the node corresponding to the object and the children nodes thereof shall be deleted. The deletion starts from a leaf node in a tree traversal from the bottom to the top.

5. When an attribute of an object is set, the attribute of the node corresponding to the object shall be set to the same value. If the attribute is expressed as an attribute of a child node, the attribute of the corresponding child node shall be set to the same value.

6. In the process of getting an attribute of an object, the node corresponding to the object shall be accessed and the attribute of the object is got according to the corresponding attribute and child nodes of the node.

7. In the process of getting the handle of an object, the XML path of the node corresponding to the object shall be returned.

8. When an object (e.g., a page) is copied to a specified position, the whole subtree starting from the node corresponding to the object shall be copied to a position right under the parent node corresponding to the specified position (e.g., a document). When the object is copied to another docbase, the object referenced to by the subtree (e.g., an embedded font) shall also be copied.

9. In the process of performing an instruction of getting layout information, a blank bitmap in a specified bitmap format is created firstly in the same size of the specified area, then all layout objects of the specified page are traversed, every layout object in the specified area (including the objects which have only parts in the area) is rendered and displayed in the blank bitmap. The process is complicated and can be performed by those skilled in the art, however, the process is still covered by the RIP technology in the prior art and will not be described herein.

10. When a role object is created, a random PKI key pair (e.g., 512-digits RSA keys) is generated, the public key of the PKI key pair is saved in the role object and the private key is returned to the application.

11. When the application logs in, a random data block (e.g., 128 bytes) is generated, and encrypted with the public key of the corresponding role object and sent to the application, the application decrypts the encrypted data block and the decrypted data block shall be authenticated, if the data block is correctly decrypted, the application is proved to possess the private key of the role and will be allowed to log in. Such authentication process may be repeated for three times and the application is allowed to log in only when the application passes all three authentication processes.

12. When signature is attached to a target object, the signature shall be attached to the subtree starting from the node corresponding to the object. The subtree shall be regularized first so that the signature will be free from being affected by physical storage variation, i.e., by logically equivalent alterations (e.g., changes of pointer caused by the changes of storage position). The regularization method includes:

traversing all nodes in the subtree whose root node is the target object (i.e., target object and the sub-object thereof) in a depth-fist traversal, regularizing each node in the order of the traversal and joining the regularization result of each node.

The regularization of a node in the subtree includes: calculating the HASH value of the children node number of the node, calculating the HASH values of the node type and node attributes, joining the obtained HASH values of the node type and node attributes right behind the HASH value of the children node number according to the predetermined order, and calculating the HASH value of the join result to obtain the regularization result of the node. When the signature also needs to be attached to an object referenced to by a node in the subtree, the object shall be regarded as a child node of the node and be regularized in the method described above.

After the regularization, the HASH value of the regularization can be generated and the signature can be attached with the private key of the role according to the techniques in the prior art which will not be described herein.

In the regularization process, the regularization of a node in the subtree may also include: joining the children node number of the node, the node type and node attributes in an order with separators in between, calculating the HASH value of the join result to obtain the regularization result of the node. Or the regularization of a node in the subtree may include: joining the children node number length, the node type length and the node attribute lengths in an order with separators in between, further joining the already joint lengths with the children node number, node type and node attributes, then the regularization result of the node is obtained. To sum up, the step of regularizing a node in the subtree may include the following step: joining original values or transformed values (e.g., HASH values, compressed values) of: the children node number, node type and node attributes, and the lengths of the children node number/node type/node attributes (optional), in a predetermined order directly or with separators in between.

The predetermined order includes any predetermined order of arranging the children node number length, node type length, node attribute lengths, children node number, node type and node attributes.

In addition, either depth-first traversal or width-first traversal is applied in the traversal of the nodes in the subtree.

It is easy to illustrate various modifications of the technical scheme of the present invention, e.g., the scheme may include joining the children node number of every node with separators in between in the order of depth-first traversal and the joining with the regularization results of other data of every node. Any method that arranges the children node numbers, node types and node attributes of all nodes in the subtree in a predetermined order constitutes a modification of this embodiment.

13. When setting a privilege on an object, the simplest method includes: recording the privileges of all roles on the object (including the sub-objects thereof) and comparing the privileges of the roles when the roles log in, if operations within the privileges, the operations shall be accepted, otherwise error information shall be returned. A preferred method applied to the present invention includes: encrypting corresponding data and controlling privileges with keys, when a role cannot present correct keys, the role does not have corresponding privilege. This preferred method provides better anti-attack performance. The detailed description of the steps of the preferred method is given below.

A PKI key pair is generated for a protected data sector (usually a subtree corresponding to an object and the sub-objects thereof), and the data sector is encrypted with the encryption key of the PKI key pair.

When a role is granted read privilege, the decryption key of the PKI key pair is passed to the role and the role may decrypt the data sector with the decryption key in order to read the data correctly.

When a role is granted write privilege, the encryption key of the key PKI pair is passed to the role and the role may encrypt modified data with the decryption key in order to write data into the data sector correctly.

Since the encryption/decryption efficiency of the PKI keys is low, a symmetric key may be used for encrypting the data sector and the encryption key further encrypts the symmetric key while the decryption key may decrypts the encrypted symmetric key data to retrieve the correct symmetric key. The encryption key may be further used for attaching a digital signature to the data sector to prevent a role with the read privilege only from modifying the data when the role is given the symmetric key. In such a case a role with the write privilege attaches a new signature to the data sector every time when the data sector is modified; therefore the data will not be modified by any role without the write privilege.

When a role is given the encryption key or decryption key, the encryption key or decryption key may be saved after being encrypted by the public key of the role, so that the encryption key or decryption key can only be retrieved with the private key of the role.

In this embodiment, the system and method for document data security management provided by the present invention are applied to the docbase management system described in the fore-going description; however, the present invention can also be applied to any system other than the docbase management system.

The system for document data security management provided by the present invention is explained herein first.

The system for document data security management of the present invention includes a role management unit, a security session channel unit, an identity authentication unit, an access control unit and a signature unit. The role management unit is used for managing at lease one role and has the functions of creating a role, granting a privilege to a role and bereaving a role of a privilege. A role can be identified with at least one unique ID and one unique PKI key pair, however, the role object saves only the ID and the public key of the role, the private key of the role is given to the application. The role can also be identified with a unique ID and a login password, and in such a case the role object saves only the ID and the encrypted login password. The ID of a role can be any number or string as long as different roles are given different IDs. The PKI algorithm can be either ECC algorithm or RSA algorithm.

A number of roles are defined in a docbase and the role objects are sub-objects of the docbase. When corresponding universal document model does not include a docbase object, the roles shall be defined in documents, i.e., the role objects shall be the sub-objects of document objects and all docbases in the document data security management system shall be replaced with documents.

Preferably, all applications are allowed to create a new role to which no privilege is granted. Certain privileges can be granted to the new role by existing roles with re-license privilege.

The key returned in response to an instruction of creating a role object shall be used for login process, the key should be kept carefully by the application, and the key is usually a private key of a PKI key pair or a login password.

A special default role can be created in the system for document data security management. When a default role is created, corresponding docbase can be processed with the default role even when no other roles log in. Preferably, a docbase creates a default role with all possible privileges when the docbase is created.

The process performed by the application from using a role (or roles) to log in so as to performing a number of operations and to logging out is regarded as a session. A session can be identified with session identification and a logged role list. The session can be performed on a security session channel in the security session channel unit which keeps at least a session key for encrypting the data transmitted on the security session channel. The session key may be an asymmetric key, or a commonly used symmetric key with more efficiency.

The identity authentication unit is used for authenticating the identity of a role when the role logs in. The identity authentication is role oriented and any role except the default role may log in only after presenting the key of the role. When a role wants to log in and the key of the role is a PKI key, the identity authentication unit retrieves the public key of the role from the role object according to the role ID and authenticates the identity of the role by using the "challenge-response" mechanism described in the fore-going description; when the key of the role is a login password, the identity authentication unit retrieves the public key of the role from the role object according to the role ID and draws comparison.

The application may log in as multiple roles at the same time and the privileges granted to the application shall then be the union of the privileges of the roles.

The access control unit is used for setting an access control privilege for document data, and a role can only access document data according to the access control privilege granted to the role. The privilege data can be managed by the access control unit so that some roles may acquire the privilege of other role and some roles may not. A role can modify privileges of other roles in normal re-license or bereave process only when the role is granted re-license privilege or bereave privilege; directly writing data into the privilege data is not allowed.

An access privilege for any role on any object (a docbase, docset, document, page, layer, object group, layout object) can be set up, and if a privilege on an object is granted to a role, the privilege can be inherited by all sub-objects of the object.

Access privileges include any one or any combination of the following privileges: read privilege (whether a role may read data), write privilege (whether a role may write into data), re-license privilege (whether a role may re-license, i.e., grant part of or all the privileges of the role to another role), bereave privilege (whether a role may bereave of privilege, i.e., delete a part or all of the privileges of another role) and print privilege (whether a role may print data), and the present invention does not limit the privileges. Preferably, a docbase creates a default role with all possible privileges when the docbase is created so that the creator of the docbase has all privileges on the docbase.

The signature unit is used for attaching a signature to any logical data specified among the document data in the system for document data security management. A role signature can be attached by the signature unit with corresponding private key and the validity of the role signature on the logical data can be verified with the public key.

The role signature can be attached to all objects. The signature covers the sub-objects of the signed object and the objects referenced by the signed object.

The method for document data security management is further explained herein with reference to the system for security management described above.

As shown in FIG. 11, the method for document data security management of the present invention includes the following steps:

When a docbase is created, the role management unit automatically grants all possible privileges on the docbase, including read privilege, write privilege, re-license privilege and bereave privilege on all objects, to the default role of the docbase.

The security session channel unit sets up a security session channel between the application and the docbase management system and initiates a session.

Determine whether the session has been successfully initiated according to session identification; if the session has been successfully initiated, the security session channel setup process shall end, otherwise the security session channel setup process shall proceed.

Either the application or the docbase management system generates a random PKI key pair.

The party which generates the random PKI key pair sends the public key of the PKI key pair to the other party.

The other party generates a random symmetric key as the session key, encrypts the session key with the public key and sends the encrypted session key to the party which generates the random PKI key pair.

The party which generates the random PKI key pair decrypts the encrypted session key with the private key of the PKI key pair.

Set up session identification.

Set the logged role list as the default role.

Role logs in

The application provides the ID of a role that shall log in and a docbase in which the role shall log.

The identity authentication unit checks the logged role list of the session, if the role (including the default role) has logged in, this step shall end, otherwise this step shall proceed.

when the key of the role is a PKI key, the identity authentication unit retrieves the public key of the role from the role object; when the key of the role is a login password, proceed Step h) directly.

The identity authentication unit generates a random data block and encrypts the data block with the public key of the role.

The identity authentication unit sends the encrypted data block to the application.

The application decrypts the encrypted data block with the private key of the role and sends the decrypted data back to the identity authentication unit.

The identity authentication unit checks whether the returned data is correct, and if the data is incorrect, the role will fail to log in, otherwise directly proceed Step i).

The application provides a login password and the identity authentication unit compares the login password saved in the role object with the login password provided by the application, if the two passwords are identical, the login process shall proceed; otherwise the role will fail to log in.

Add the role into the logged role list of the session.

Create a new role

The application issues an instruction of creating a new role.

The role management unit generates a unique role ID.

When the instruction requires the key of the to-be-created role to be a PKI key, the role management unit generates a random PKI key pair; when the instruction requires the key of the to-be-created role to be a login password, the login password of the role shall be the password specified by the instruction or generated at random by the role management unit.

The role management unit creates a role object in the docbase and saves the ID and the key (the public key or login password) in the role object, and the privilege of the role is null, i.e., the role has no privilege on any object.

Return the ID and the key (the private key or login password) to the application.

Grant a privilege P on an object O to a role R

When granting a privilege on an object, the simplest method includes: recording the privileges of each role on the object (including the sub-objects thereof) and comparing the privileges of each role when the role log in, if an operation within the privileges, the operation shall be accepted, otherwise error information shall be returned. A preferred method applied to the present invention includes: encrypting corresponding data and controlling privileges with a key, when a role cannot present a correct key, the role does not have corresponding privilege. This preferred method provides better anti-attack performance.

The application sends a privilege request.

The role management unit obtains the union of the privileges of all roles in the logged role list on the object O and determines whether the union is a superset of the privilege P and whether the union includes re-license privilege. If the union is a superset of the privilege P and the union includes the re-license privilege, the process shall proceed, otherwise the granting of the privilege will fail (because the privileges of all the roles still do not include a privilege used for granting).

The role management unit adds the privilege P on the object O into the privilege list of the role R. If the privilege P does not include read or write privilege, the privilege granting process is completed, otherwise the process continues.

The access control unit checks whether read/write access control privilege is set up on the object O. If no read/write access control privilege is set up on the object O, steps as follows shall be performed.

Generate a random symmetric key and a random PKI key pair.

Encrypt the object O with the symmetric key; if the read/write access control privilege is set up on a subobject of the object O, the subobject shall remain unchanged.

A PKI key pair shall be generated for a data sector to be protected (usually a subtree corresponding to an object and the subobjects thereof), and the data sector is encrypted with the encryption key of the PKI key pair.

Encrypt the symmetric key with the encryption key of the PKI key pair, save the encryption word and sign the target object to obtain a signature.

Check all roles in the docbase. If a role has read privilege on object O (here the object O may be a subobject of the object on which the role has the read privilege), the decryption key shall be encrypted with the public key of the role and encryption word of the decryption key is saved in the privilege list of the role. If a role has write privilege on object O (here the object O may be a subobject of the object on which the role has the write privilege), the encryption key shall be encrypted with the public key of the role and encryption word of the encryption key is saved in the privilege list of the role.

Proceed Step h).

Choose a role that has needed privilege (the read privilege or write privilege) on the object O from all logged roles.

Obtain the encryption word of a corresponding key corresponding to the object O from the privilege list of the role (the read privilege requires the decryption key and the write privilege requires the encryption key, the combination of the read privilege and write privilege requires both keys), if the key of the role is a PKI key, the encryption word of the corresponding key is sent to the application and Step g) is performed; if the key of the role is a login password, the access control unit decrypts the encryption word of the corresponding key and then Step h) is performed.

When a role is granted the read privilege, the decryption key of the PKI key pair is passed to the role and the role may decrypt the data sector with the decryption key to read the data correctly. When a role is granted the write privilege, the encryption key of the PKI key pair is passed to the role and the role may encrypt modified data with the encryption key in order to write data into the data sector correctly.

The application decrypts encryption word of the corresponding key with the private key of the role to retrieve the key and returns the key to the access control unit.

The access control unit encrypts corresponding key according to the privilege P, generates corresponding encryption word of the corresponding key and saves the encryption word into the privilege list of the role R.

When a role is given an encryption key or decryption key, the encryption key or decryption key may be saved after being encrypted with the public key of the role, so that the encryption key or decryption key can only be retrieved with the private key of the role.

Since the encryption/decryption efficiency of the PKI keys is low, a symmetric key may be used for encrypting the data sector and the encryption key further encrypts the symmetric key while the decryption key may decrypt the encrypted key data to retrieve the correct symmetric key. The encryption key may be further used for attaching a digital signature to the data sector to prevent a role with read privilege only from modifying the data when the role is given the symmetric key. In such case a role with write privilege attaches a new signature to the data sector every time when the data sector is modified; therefore the data will not be modified by any role without write privilege.

Bereave a role R of a privilege P on an object O

The application sends a request of bereaving of a privilege.

The role management unit checks all roles in the logged role list to determine whether there is a role has a bereave privilege on the object O. If no role has the bereave privilege, the process of bereaving of the privilege will fail, otherwise the process continues.

Delete the privilege P from the privileges of the role R on the object O.

If the privilege P includes read or write privilege, corresponding decryption key or encryption key for the object O shall be removed from the privilege list of the role R.

Read an object O

The application sends an instruction of reading the object O.

The access control unit checks the privileges of all roles in the logged role list on the object O and determines whether there is at least one role in the logged role list has read privilege on the object O. If no role has the read privilege, the reading process fails; otherwise the process continues.

Check whether read/write access control privilege is set up on the object O. If no read/write access control privilege is set up, check the parent object of the object O and the parent object of the parent object until an object with the read/write access control privilege is found.

Choose a role that has the read privilege on the found object.

Extract the encryption word of the decryption key of the found object from the privilege list of the role, when the key of the role is a PKI key, the encryption word of the decryption key is sent to the application and Step f) is performed; when the key of the role is a login password, the access control unit decrypts the encryption word of the decryption key and Step g) is performed.

The application decrypts the encryption word of the decryption key with the private key of the role to retrieve the decryption key and returns the decryption key to the access control unit.

The access control unit decrypts encryption word of the symmetric key of the object with the decryption key to retrieve the symmetric key of the object.

Decrypt encryption word of the data of the object O with the symmetric key to retrieve the data of the object O.

Return the decrypted data of the object O to the application.

Write an object O

The application sends an instruction of writing into the object O.

The access control unit checks the privileges of all roles in the logged role list on the object O and determines whether there is at least one role in the logged role list has write privilege on the object O. If no role has the write privilege, the writing process fails, otherwise the process continues.

Check whether read/write access control privilege is set up on the object O. If no read/write access control privilege is set up, check the parent object of the object O and the parent object of the parent object until an object O1 with the read/write access control privilege is found.

Choose a role that has the write privilege on the object O1.

Extract the encryption word of the encryption key of the object O1 from the privilege list of the role. When the key of the role is a PKI key, the encryption word of the encryption key is sent to the application and Step f) is performed. When the key of the role is a login password, the access control unit decrypts the encryption word of the encryption key and Step g) shall be performed.

The application decrypts the encryption word of the encryption key with the private key of the role to retrieve the encryption key of the object O1 and returns the encryption key of the object O1 to the access control unit.

Encrypt modified data of the object O with the encryption key of the object O1 (if read/write access control privilege is set up on a subobject of the object O, the subobject is encrypted with the original key of the subobject).

Overwrite the original data with the encrypted data and the writing process shall end.

Sign an object O to obtain a signature

The application sends an instruction of signing an object O to obtain a signature.

The access control unit regularizes the data of the object O.

When a signature is attached to an object, the signature shall be attached to the subtree starting from the node corresponding to the object. The regularization should be done first so that the signature will be free from being affected by physical storage variation, i.e., by logically equivalent alterations (e.g., change of pointer caused the change of storage position). The regularization method is given in the foregoing description.

Calculate HASH value of the regularization result.

Send the HASH value to the application.

The application encrypts the HASH value with the private key of the role (i.e., the signature) when the key of the role in the logged role list is a PKI key.

The application returns the signature result to the access control unit

The access control unit saves the signature result in a digital signature object.

log out a logged role

The application sends an instruction for logging out a logged role.

The security session channel unit deletes the logged role from the logged role list if the logged role list includes the logged role.

Terminate session

Either the application or the docbase management system sends a session termination request.

The security session channel unit terminates all threads related to the present session, erases the session identification and deletes the logged role list.

FIG. 1 is a flowchart illustrating a flowchart of a general method for privilege control in a docbase management system according to an embodiment of the present invention. The document data in the docbase management system is stored in a tree structure which includes at least one node object and each node object represents one document data object. As shown in FIG. 1, the method may include the steps as follows.

Figure 2:
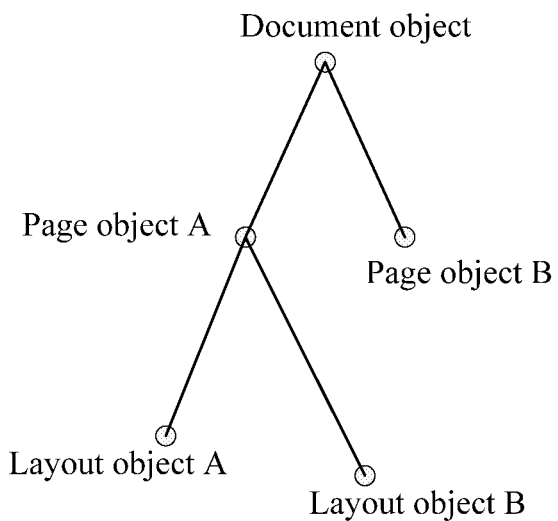
FIG. 2 shows an exemplary tree structure of document data according to an embodiment of the present invention.

In step 101, types of privileges supported by a document data object are set. Since the document data is stored in the tree structure including at least one node object, setting types of privileges supported by a document data object may include: setting types of privileges supported by each node object in the tree structure of the document data. In addition, the types of privileges may be referred to as privileges in practice but do not refer to privileges allocated to a role. FIG. 2 shows an exemplary tree structure of the document data. As shown in FIG. 2, the document data is a document file, and the document file includes two pages and one of the pages includes two layout objects. Thus, the root node of the tree structure of the document data is the document object, and the document object includes two sub-node objects, denoted as page object A and page object B respectively. The page object A includes two sub-node objects, respectively denoted as layout object A and layout object B. The page object A and the page object B are both page objects, thus are the same type of node objects. Similarly, the layout object A and the layout object B are both layout objects, and are the same type of node objects. Suppose the privileges supported by the document object include: a privilege for viewing a title and a privilege for modifying the title. When allocating a privilege to role 1 for the document object, anyone or any combination of the privileges supported by the document object (i.e. the privilege for viewing the title and/or the privilege for modifying the title) can be allocated to role 1.

Herein, information related to the types of privileges supported by each node object may be directly stored in the node object, or stored independently as a sub-object of the node object. Or, a relationship which associates each node object with the types of privileges supported by the node object can be stored in a database or in a privilege file.

In step 102, a privilege is allocated to each role for each document data object according to the types of privileges set for the document data objects in step 101.

The detailed process may include: selecting at least one type of privileges from among all the privileges supported by the document data objects in step 101 for different roles, and setting the selected privilege as the privilege of the role for the document data object.

In step 103, the docbase management system receives an operation request from a role, determines whether the role has the privilege of perform an operation specified in the operation request according to the privilege allocated to the role; if the role has the privilege to perform the operation specified in the operation request, step 104 is performed; otherwise, step 105 is performed.

In step 104, the operation is performed and the process is ended.

In step 105, the operation request of the role is rejected and the process is ended.

The step 103 to step 105 describe a detailed procedure of the docbase management system controlling operations of the role according to the privilege allocated to the role for each document data object.

Figure 3:
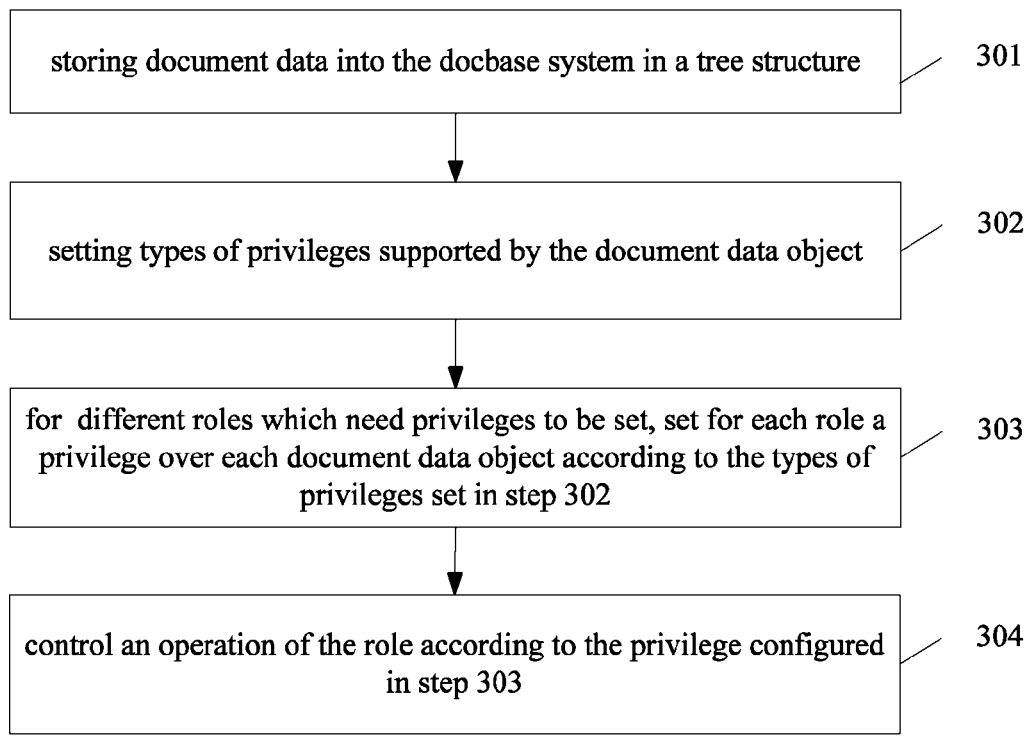
FIG. 3 is a flowchart illustrating a detailed method for privilege control in a docbase management system according to an embodiment of the present invention.

Then, a network-type docbase management system is taken as an example for describing a detailed implementation of the present invention. The docbase management system includes a client and a server. FIG. 3 is a flowchart illustrating a privilege implementation method in the docbase management system according to an embodiment of the present invention. As shown in FIG. 3, the method may include the steps as follows.

In step 301, document data is stored in the docbase management system in a tree structure. The tree structure includes at least one node object, and each node object represents a document data object. Specifically, the tree structure may include the following types of nodes from root to leaves: docbase, document set, document, page, layer, object flow and object. The tree structure of the docbase management system may not include all the above types of node objects. One or more types of nodes may be omitted in different situations. For example, the docbase management system may convert documents into a uniform format. The conversion may be performed at the client or at the server. The server stores the converted documents in different categories according to document sets the converted documents belong to. A document set is composed of multiple documents. Various manners may be adopted for managing relationships between the documents and the document sets, e.g., by utilizing the directory managing function of a file system in an operating system, or by utilizing a relationship database.

In embodiments of the present invention, the system may also select whether to save a source file, i.e. an original document, corresponding to each node object in the tree structure.

When storing a document in the docbase management system, to ensure security of the document, the document may be encrypted before being stored in the docbase management system.

In step 302, types of privileges supported by the document data object are set.

In this step, for each document data object, types of privileges supported by the document data object are set. The detailed process may be as follows: setting privileges supported by each node object corresponding to each document data object in the tree structure of the document data. Specifically, the setting operation may be performed during development of a docbase product or during installation of the docbase management system, or at any time according to an administrator's instruction. The types of privileges supported by each document data object may be set according to configuration data of the docbase management system, or according to a user's selection, or a combination of the two manners. Hereinafter, the tree structure shown in FIG. 2 will be taken as an example for describing the setting of the types of privileges for each document data object according to a user's selection. For example, during development of the docbase product, a reading privilege, a writing privilege, a privilege for adding a layout object and a privilege for adding a layer object are developed for each page object. The docbase management system may also provide a selection entry for the user. According to the user's selection, the writing privilege is screened for page object A, and the reading privilege, the writing privilege and the privilege for adding a layout object are screened for page object B. As such, the privileges supported by page object A will include the reading privilege, the privilege for adding a layout object and the privilege for adding a layer object, while the privilege supported by page object B will include the privilege for adding a layer object.

Take the tree structure mentioned in step 301 as an example, the types of privileges set for the node objects at each level may specifically include:

1. types of privileges supported by a docbase may include anyone or any combination of the following:

a, a privilege for adding a document set, denoting whether it is allowed to add a document set in the docbase;

b, a re-grant privilege, denoting whether it is allowed to transfer a privilege for the docbase to another role;

c, a withdraw privilege, denoting whether it is allowed to withdraw an allocated privilege for the docbase;

2. types of privileges supported by a document set may include anyone or any combination of the following:

a, a privilege for viewing the title, denoting whether it is allowed to view the title of the document set;

b, a privilege for viewing privileges, denoting whether it is allowed to view privilege allocations of the document set;

c, a privilege for submitting a document, denoting whether it is allowed to submit a document to the document set;

d, a withdraw privilege, denoting whether it is allowed to withdraw a privilege allocated to the document set;

e, a re-grant privilege, denoting whether it is allowed to transfer the privilege of the document set to another role;

f, a delete privilege, denoting whether it is allowed to delete the document set;

3. types of privileges supported by a document may include anyone or any combination of the following:

a, a privilege for viewing the title, denoting whether it is allowed to view the title of the document;

b, a privilege for viewing privileges, denoting whether it is allowed to view privilege allocations of the document;

c, a privilege for viewing elements, denoting whether it is allowed to viewing the elements of the document;

d, a privilege for modifying elements, denoting whether it is allowed to modify the elements of the document;

e, a withdraw privilege, denoting whether it is allowed to withdraw an allocated privilege of the document;

f, a re-grant privilege, denoting whether it is allowed to transfer the privilege of the document to another role;

g, a delete privilege, denoting whether it is allowed to delete the document;

h, a privilege for downloading a source file, denoting whether it is allowed to download a source file of the document;

i, a privilege for reading text, denoting whether it is allowed to read the text of the document;

j, an excerpt privilege, denoting whether it is allowed to excerpt characters in the text, e.g. export characters by utilizing a clipboard;

k, a print privilege, denoting whether it is allowed to print the document.

Among the above privileges supported by the document, privileges h-k are privileges for operations on document data. The implementations of the excerpt privilege and the print privilege are different from those of other privileges and will be described in detail later.

4. Types of privileges supported by a page may include anyone or any combination of the following:

a, a privilege for viewing allocated privileges: denoting whether it is allowed to view privilege allocations of the page;

b, a privilege for adding a layer, denoting whether it is allowed to add a layer for the page;

c, a privilege for configuring an attribute, denoting whether it is allowed to configure an attribute for the page; the privilege may be divided further into sub-privileges regarding attributes such as size, portrait or landscape orientation, page margin, etc.;

d, a delete privilege, denoting whether it is allowed to delete the page;

e, a re-grant privilege, denoting whether it is allowed to transfer the privilege of the page to another role;

f, a withdraw privilege, denoting whether it is allowed to withdraw an allocated page privilege.

5. Types of privileges supported by a layer may include anyone or any combination of the following:

a, a privilege for viewing allocated privileges, denoting whether it is allowed to view privilege allocations of the layer;

b, a privilege for adding an object flow, denoting whether it is allowed to add an object flow on the layer;

c, a privilege for configuring an attribute, denoting whether it is allowed to configure an attribute for the layer, wherein the privilege may be divided further into sub-privileges regarding attributes such as overlapping order, transparency, rotation angle, etc.;

d, a delete privilege, denoting whether it is allowed to delete the layer;

e, a re-grant privilege, denoting whether it is allowed to transfer the privilege of the layer to another role;

f, a withdraw privilege, denoting whether it is allowed to withdraw an allocated layer privilege.

6. Types of privileges supported by an object flow may include anyone or any combination of the following:

a, a privilege for viewing allocated privileges, denoting whether it is allowed to view privilege allocations of the object flow;

b, a privilege for adding an object, denoting whether it is allowed to add an object into the object flow;

c, a privilege for configuring an attribute, denoting whether it is allowed to configure an attribute for the object flow, wherein the privilege may be divided further into sub-privileges regarding attributes such as size, location, color, rotation angle, etc.;

d, a delete privilege, denoting whether it is allowed to delete the object flow;

e, a re-grant privilege, denoting whether it is allowed to transfer the privilege allocated to the object flow to another role;

f, a withdraw privilege, denoting whether it is allowed to withdraw an allocated privilege;

g, a privilege for modifying the object flow, denoting whether it is allowed to modify the object flow.

7. Types of privileges supported by an object may include anyone or any combination of the following:

a, a privilege for viewing allocated privileges, denoting whether it is allowed to view privilege allocations of the object;

b, a privilege for configuring an attribute, denoting whether it is allowed to configure an attribute for the object, wherein the privilege may be divided further into sub-privileges regarding attributes such as size, location, color, rotation angle, title, contents, etc.;

c, a delete privilege, denoting whether it is allowed to delete the object;

d, a re-grant privilege, denoting whether it is allowed to transfer the privilege of the object to another role;

e, a withdraw privilege, denoting whether it is allowed to withdraw an allocated privilege;

f, a privilege for modifying the object, denoting whether it is allowed to modify the object.

The above re-granting actually includes two situations, one is the privilege of granting the privilege of the object to another role (i.e. reserve the privilege after granting the privilege to the another role); the other is the privilege of transferring the privilege of the object to another role (i.e. the privilege is no more reserved after the privilege is granted to the another role). In practice, it can be configured whether to reserve the privilege after the privilege is granted to another role. The above withdraw privilege also includes two situations, with the first situation being withdrawing a privilege granted by the role and the other situation being withdrawing a privilege not necessarily granted by the role. Therefore, it also can be configured whether the privilege to be withdrawn is granted by the role.

In this embodiment, 45 types of privileges of 7 node objects are listed. In practice, different node objects can be selected and other privileges for the node objects can be set according to the needs to implement diversified management to the document data.

The above is merely exemplary description to the types of privileges supported by each node object. Actually, the types of privileges for each node object may be set according to the needs. And some of the above privileges may be combined into one combined privilege, e.g., the privilege for viewing object name and the privilege for viewing object attribute may be combined into one privilege. In addition, types of privileges supported by a sub-object of one object may also be taken as the types of privileges supported by the object, e.g. the privilege for adding a layer to a page may be taken as a type of privilege of a document. In practice, the settings can be flexible according to the needs.

When setting privileges supported by each node object, privileges may be set for different node objects of the same type, and are supported by all node objects of the type. Privileges can also be set for each of node object respectively. Two node objects of the same type may support the same or different privileges. For example, privileges may be selected in batch for documents through a document set, i.e. the same document privileges will be selected for all documents in a document set.

Still taking FIG. 2 as an example, when setting privileges supported by pages, for different pages such as page object A and page object B, privileges supported by the pages can be set in uniform. Thus, page object A and page object B will support the same types of privileges. Alternatively, privileges may be set respectively for each page, which is more flexible but more complicated compared with the uniformly setting manner.

When configuring the privileges supported by each node object, it can be set in default that privileges supported by a parent node object include the privileges supported by child node objects; or it can be set in default that the privileges supported by a child node object include the privileges supported by the parent node object of the child node object.

Relationships which associate each node object with the privileges supported by the node object may be stored in a database or in a privilege file.

For example, suppose that there are m object types (i.e. node objects), respectively denoted as O1, O2, . . . Om. For each object type Oi ($1<=i<=m$), ni types of privileges may be defined for the object type, respectively denoted by P1, P2, . . . , Pni. When storing the types of privileges, ni element groups (Oi, Pj) are generated for the object type Oi, wherein $1<=j<=ni$. Each element group is used for identify a type of privilege configured for object type Oi. For all m object types, there may be Σ ni ($1<=i<=m$) element groups generated altogether.

If a database is adopted for storing the types of privileges set, the Σ ni ($1<=i<=m$) element groups may be stored into one table, with each element group occupying one row. The table includes at least two columns among which two columns respectively store the object types and types of privileges corresponding to the object types.

If the privilege file is adopted for storing the types of privileges set, the Σ ni ($1<=i<=m$) element groups may be stored in one text file, with each element group occupying one row. In each row, the object type is firstly stored and then the types of privileges are stored, and the object type and the types of privileges are isolated by spaces.

In step 303, based on the types of privileges set in step 302, each role which needs privileges to be set is allocated a privilege for each document data object.

Since different types of privileges have been set for different node objects in step 302, in this step, the privileges set for the role over each document data object are within the scope of the types of privileges supported by the document data objects, i.e. the privilege set for the role over each document data object is a subset of the privileges supported by each node object. Thus, the operation for setting the privilege for the role is completed.

When setting the privilege for the role over each document data object, the procedure may be as follows: select a privilege from the privileges supported by each node object corresponding to each document data object is selected, setting the selected privilege as the privilege of the role over the document data object. The privileges of the role over different node objects of the same type can be set uniformly, i.e., setting the same privilege for the role over all node objects of the same type. But it is required that all the node objects of the same should support the privilege set for the role. Alternatively, a privilege for the role over each of the node objects of the same type can be set respectively, i.e. set a privilege for the role over different node objects of the same type respectively. Still taking FIG. 2 as an example, the tree structure has two page objects, i.e., page object A and page object B respectively. When setting privileges for the page object A and the page object B, different privileges can be set for the role over the page object A and the page object B, e.g., setting a privilege for viewing a title of the page object A and setting a re-grant privilege of the page object B.

When setting the privilege for the role over each node object, it can be set that the role has the same privilege over all sub node objects of a node object as long as all the sub node objects of the node object support the privilege. In this step, the relationship associating the role with the privileges of the role over all node objects may be saved in a privilege file or stored in a database. The detailed storage manner can be obtained by referring to the manner for storing the types of privileges in step 302.

In step 304, operations of the role on the document data are controlled according to the privileges set in step 303 for the role over the document data objects.

The detailed process may include: the role sends an operation request to the docbase management system; the docbase management system inquires the privilege set for the role, determines whether the role has the privilege of performing the operation specified in the operation request. If the role has the privilege of performing the operation specified in the operation request, the docbase management system allows the operation of the role specified in the operation request; otherwise, the docbase management system rejects the operation request of the role.

In the above embodiment, the detailed implementation of the present invention is described by taking the network-based docbase management system as an example. In fact, the method of the present invention is also applicable for a stand-alone docbase management system. Differences only lie in that the server and the client are located in the same physical entity.

Figure 4:
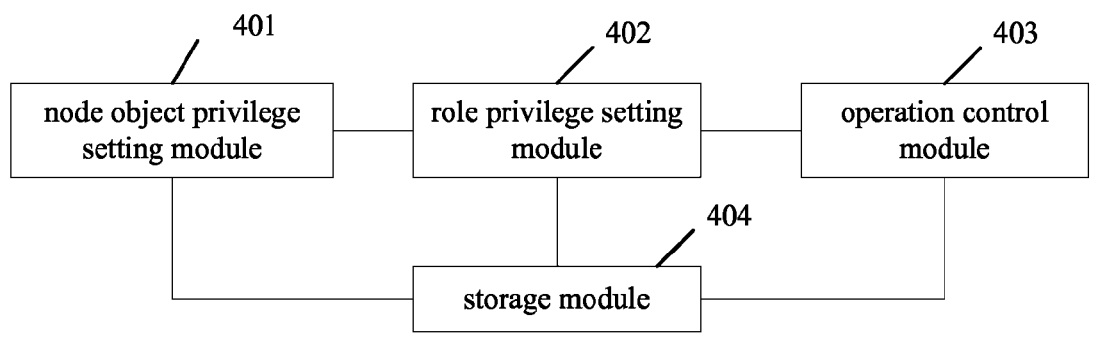
FIG. 4 is a schematic illustrating a structure of an apparatus for privilege control in a docbase management system according to an embodiment of the present invention.

Embodiments of the present invention also provide an apparatus for privilege control in the docbase management system. The apparatus is adopted in the docbase management system, wherein document data in the docbase management system includes at least one document data object. The document data is stored in a tree structure including at least one node object, with each node object representing one document data object. FIG. 4 is a schematic illustrating a structure of an apparatus for privilege control in the docbase management system according to an embodiment of the present invention. As shown in FIG. 4, the apparatus may include a document data object privilege setting module 401, a role privilege setting module 402 and an operation control module 403.

The document data object privilege setting module 401 is adapted to set for each document data object privileges supported by the document data object.

The role privilege setting module 402 is adapted to select, when setting a privilege for a role over a document data object, at least one privilege from the privileges set by the document data object privilege setting module 401 for the document data object and supported by the document data object, and set the at least one privilege selected as the privilege for the role over the document data object.

The operation control module 403 is adapted to control, when the role is to operate on the document data object, an operation of the role on the document data according to the privilege set by the role privilege setting module 402 for the role over the document data object.

The apparatus for privilege control in the docbase management system may further include a storage module 404, adapted to store a relationship which associates the document data object with the privilege which is set by the document data object privilege setting module 401 and supported by the document object, so that the role privilege setting module 402 may obtain the privilege supported by the document object from the relationship; and/or, adapted to store a relationship which associates the role with the privilege set by the role privilege setting module 402 for the role over the document data object, so that the operation control module 403 may obtain the privilege of the role over the document data object from the relationship.

It can be seen from the above descriptions of the embodiments of the present invention, the present invention enriches the types of document privilege managements, realizes access control of a role over different document data objects; increases the types of privilege managements, improves the flexibility of privilege management. As such, through the method of the present invention, a docbase management system with multiple privileges is realized, and privilege management to the document is improved.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A method for privilege control executed on a processor, comprising:
    selecting a privilege from at least one privilege supported by a document data object of document data stored in a docbase management system, wherein, the document data stored in the docbase management system includes at least one document data object, and the said at least one document object supports the at least one privilege;
    the document data stored in the docbase management system includes at least one signature, and each signature is the result of encrypting the HASH value of the regularization result of at least one document object with the private key of a role;
    setting, when setting a privilege for a role on the document data object, the privilege selected as the privilege of the role over the document data object; and
    controlling, when the role is to perform an operation on the document data object, the operation of the role on the document data object according to the privilege of the role over the document data object.

2. The method of claim 1, further comprising: storing a relationship which associates the document data object with the at least one privilege supported by the document data object to obtain the at least one privilege supported by the document data object according to the relationship; and/or
    storing a relationship which associates the role with the set of privilege granted to the role on the document data object to obtain the set of privilege granted to the role on the document data object according to the relationship.

3. The method of claim 2, wherein the relationship which associates the document data object with the at least one privilege supported by the document data object and/or the relationship which associates the role with the set of privilege granted to the role on the document data object is stored in a database or in a file.

4. The method of claim 2, wherein the document data is in a tree structure comprising at least one node object, and each node object in the tree structure represents a document data object.

5. The method of claim 2, wherein the at least one privilege supported by the document data object is a privilege supported by a node object corresponding to the document data object;
    the step of selecting a set of privilege from the at least one privilege supported by the document data object and granting the set of privilege selected to the role as the set of privilege of the role on the document data object comprises:
    selecting a set of privilege from the at least one privilege supported by the node object corresponding to the document data object, and granting the privilege selected to the role as the privilege of the role on the document data object.

6. The method of claim 5, wherein the relationship which associates the document data object with the at least one privilege supported by the document data object comprises: a relationship which associates a node object with the at least one privilege supported by the node object;

the relationship which associates the role with the set of privilege granted to the role on the document data object comprises: a relationship which associates the role with a set of privilege granted to the role on a node object; wherein the node object is corresponding to the document data object.

7. The method of claim 5, wherein the tree structure comprises anyone or any combination of following levels of node objects in sequence: a docbase, a document set, a document, a page, a layer, an object stream and a layout object.

8. The method of claim 7, wherein the at least one privilege supported by the node object corresponding to the document data object comprises anyone or any combination of:

a privilege of viewing an attribute of the node object, a privilege of viewing a name of the node object, a privilege of modifying the name of the node object, a privilege of modifying the attribute of the node object, a privilege of granting the privilege on the node object to another role, a privilege of re-licensing the privilege on the node object to another role, a privilege of bereaving a privilege of another role on the node object, a privilege of view privilege granted on the node object, a privilege of printing information of the node object, a privilege of downloading a source file corresponding to the node object, a privilege of deleting a node object, a privilege of creating a sub-node of the node object, and a privilege of deleting a sub-node of the node object.

9. The method of claim 8, wherein if the node object corresponding to the document data object is a document or a page, the at least one privilege supported by the node object corresponding to the document data object further comprises anyone or any combination of: a privilege of reading text corresponding to the node object, a privilege of excerpting characters corresponding to the node object, and a privilege of modifying the node object.

10. The method of claim 8, wherein if the node object corresponding to the document data object is an object stream or an object, the at least one privilege supported by the node object corresponding to the document data object further comprises: a privilege of modifying the node object.

11. The method of claim 7, wherein the at least one privilege supported by the node object corresponding to the document data object further comprises: a privilege supported by a sub-node object of the node object, or a privilege supported by a parent node object of the node object.

12. The method of claim 5, wherein different node objects of the same type in the tree structure support the same or different privileges.

13. The method of claim 5, wherein different sets of privilege or the same set of privilege is granted to a role on different node objects of the same type in the tree structure.

14. The method of claim 5, further comprising: selecting a set of privilege uniformly for at least one sub-node object of the node object corresponding to the document data object, and granting the set of privilege to the role on the at least one document data object corresponding to the at least one sub-node object uniformly.

15. The method of claim 5, wherein controlling the operation of the role on the document data object according to the set of privilege granted to the role on the document data object comprises:

determining whether the role has a privilege of performing the operation on the document data object according to the set of privilege of the role on the document data object, if the role does not have the privilege of performing the operation on the document data object, rejecting the operation of the role on the document data object.

16. The method of claim 1, wherein the at least one privilege supported by the node object corresponding to the document data object is set based on configuration data of the docbase management system; and/or is designated by an administrator when the docbase management system is installed or in operation; and/or is set based on a document data-specific privilege configured by a user when the docbase management system is installed or in operation.

17. The method of claim 1, wherein, the document data stored in the docbase management system is encrypted.

18. The method of claim 1, wherein the set of privilege selected includes zero or at least one privilege.

19. An apparatus of privilege control, comprising a processor and a memory storing instructions executable by the processor, and further comprising:

a first module, adapted to set at least one privilege for at least one document data object of document data stored in a docbase management system which is supported by the at least one document data object, wherein, the document data stored in the docbase management system includes the at least one document data object, and the at least one document object supports the at least one privilege;

the document data stored in the docbase management system includes at least one signature, and each signature is the result of encrypting the HASH value of the regularization result of at least one document object with the private key of a role;

a second module, adapted to select, when setting a privilege for a role over a document data object, a privilege from the at least one privilege set by the first module for the document data object and supported by the document data object, and set the privilege selected as the privilege of the role over the document data object; and a third module, adapted to control, when the role is to perform an operation on the document data object, the operation of the role on the document data object according to the privilege set by the second module for the role over the document data object.

20. The apparatus of claim 19, further comprising:

a fourth module, adapted to save a relationship which associates the document data object with the privilege supported by the document data object set by the first module to enable the second module to obtain the privilege supported by the document data object according to the relationship; and/or adapted to save a relationship which associates the role with the privilege of the role over the document data object to enable the third module to obtain the privilege of the role over the document data objet according to the relationship.

* * * * *